US009316718B2

(12) United States Patent
Stählin et al.

(10) Patent No.: US 9,316,718 B2
(45) Date of Patent: Apr. 19, 2016

(54) C2X COMMUNICATION WITH REDUCED DATA VOLUME

(75) Inventors: Ulrich Stählin, Eschborn (DE); Thomas Grotendorst, Eschborn (DE)

(73) Assignee: Continental Teves AG & Co. oHG (DE)

( * ) Notice: Subject to any disclaimer, the term of this patent is extended or adjusted under 35 U.S.C. 154(b) by 930 days.

(21) Appl. No.: 13/375,953

(22) PCT Filed: May 6, 2010

(86) PCT No.: PCT/EP2010/056202
§ 371 (c)(1),
(2), (4) Date: May 15, 2012

(87) PCT Pub. No.: WO2010/139526
PCT Pub. Date: Dec. 9, 2010

(65) Prior Publication Data
US 2012/0220231 A1    Aug. 30, 2012

(30) Foreign Application Priority Data

Jun. 3, 2009 (DE) .................. 10 2009 026 653
Feb. 18, 2010 (DE) .................. 10 2010 002 093

(51) Int. Cl.
*H04W 84/18* (2009.01)
*G01S 5/00* (2006.01)
*H04L 29/08* (2006.01)

(52) U.S. Cl.
CPC ............... *G01S 5/0072* (2013.01); *H04L 67/12* (2013.01)

(58) Field of Classification Search
CPC ........ H04W 84/18; G01S 5/0072; H04L 67/12
USPC .......................................... 455/41.2; 701/117
See application file for complete search history.

(56) References Cited

U.S. PATENT DOCUMENTS

| | | | | | |
|---|---|---|---|---|---|
| 5,721,733 A | * | 2/1998 | Wang | ............ | H04L 1/1848 370/332 |
| 5,974,368 A | * | 10/1999 | Schepps | ............ | G07C 5/008 340/10.2 |
| 6,064,705 A | * | 5/2000 | Zalud | ............ | G07C 5/008 341/70 |

(Continued)

FOREIGN PATENT DOCUMENTS

| | | |
|---|---|---|
| CN | 1486417 A | 3/2004 |
| CN | 1761979 A | 4/2006 |

(Continued)

OTHER PUBLICATIONS

International Application Serial No. PCT/EP2010/056202, International Search Report mailed Jul. 23, 2010, 6 pgs.

(Continued)

*Primary Examiner* — Hai V Nguyen
(74) *Attorney, Agent, or Firm* — RatnerPrestia

(57) ABSTRACT

By reducing the packet size for C2X data transmission, it is possible to increase the transmission range and the number of transmitted data packets per unit time. By way of example, only component information items are transmitted, which can be converted into a full information item by the receiver using supplementary information items that come from a different source. In order to obtain the full information items, it is possible to utilize firstly transmission properties of the radio medium and secondly common information bases as determined by the system.

14 Claims, 2 Drawing Sheets

(56) References Cited

U.S. PATENT DOCUMENTS

| | | | |
|---|---|---|---|
| 6,104,978 A | 8/2000 | Harrison et al. | |
| 6,150,961 A * | 11/2000 | Alewine | G08G 1/01 340/905 |
| 6,268,804 B1 * | 7/2001 | Janky | G08G 1/166 180/169 |
| 6,369,720 B1 * | 4/2002 | Wilhelm | G08G 1/163 340/435 |
| 6,397,141 B1 * | 5/2002 | Binnig | G08G 1/096716 340/903 |
| 6,433,704 B1 * | 8/2002 | Fushiki | G08G 1/0104 340/539.1 |
| 6,480,789 B2 * | 11/2002 | Lin | G05D 1/0055 340/947 |
| 6,571,089 B1 * | 5/2003 | Richards | H04B 1/7163 455/266 |
| 6,604,045 B2 * | 8/2003 | Kuroda | G01C 21/362 701/423 |
| 6,720,920 B2 * | 4/2004 | Breed | B60N 2/2863 342/357.31 |
| 6,741,932 B1 * | 5/2004 | Groth | G01C 21/3492 701/117 |
| 6,788,951 B2 * | 9/2004 | Aoki | H04L 1/0007 340/936 |
| 6,885,716 B1 * | 4/2005 | Zalud | G07C 5/008 375/282 |
| 6,911,918 B2 * | 6/2005 | Chen | G08G 1/0104 340/905 |
| 6,965,325 B2 * | 11/2005 | Finnern | G08G 1/096816 340/995.17 |
| 6,965,829 B2 * | 11/2005 | Yamadaji | G08G 1/161 340/436 |
| 6,985,089 B2 * | 1/2006 | Liu | G08G 1/161 340/436 |
| 7,020,468 B2 * | 3/2006 | Squibbs | H04W 99/00 455/404.2 |
| 7,020,556 B2 * | 3/2006 | Kim | G01C 21/26 340/995.13 |
| 7,099,774 B2 | 8/2006 | King et al. | |
| 7,355,525 B2 * | 4/2008 | Tengler | G08G 1/0962 340/10.2 |
| 7,373,231 B2 * | 5/2008 | McClure | A01B 69/004 280/456.1 |
| 7,382,274 B1 * | 6/2008 | Kermani | B60K 31/0058 340/435 |
| 7,400,294 B2 * | 7/2008 | Whitehead | G01S 19/07 342/357.24 |
| 7,469,277 B2 * | 12/2008 | Hirata | G01S 5/0009 342/357.55 |
| 7,487,252 B2 * | 2/2009 | Vossler | H04L 12/4612 370/328 |
| 7,593,999 B2 * | 9/2009 | Nathanson | G07C 5/008 701/300 |
| 7,706,963 B2 * | 4/2010 | Parikh | G08G 1/127 340/901 |
| 7,804,423 B2 * | 9/2010 | Mudalige | G08G 1/161 340/902 |
| 8,027,273 B2 * | 9/2011 | Nguyen | H04L 41/12 370/238 |
| 8,032,081 B2 * | 10/2011 | Bai | H04L 12/1818 455/11.1 |
| 8,045,498 B2 * | 10/2011 | Hyland | G01S 5/0036 370/315 |
| 8,140,266 B2 * | 3/2012 | Nakamura | B60W 40/072 701/495 |
| 8,140,358 B1 * | 3/2012 | Ling | G06Q 40/08 340/439 |
| 8,229,663 B2 * | 7/2012 | Zeng | B60W 40/02 180/168 |
| 8,260,515 B2 * | 9/2012 | Huang | B60W 40/09 701/1 |
| 8,280,583 B2 * | 10/2012 | Stahlin | H04L 67/12 180/168 |
| 8,314,718 B2 * | 11/2012 | Muthaiah | H04L 47/10 340/426.24 |
| 8,442,791 B2 * | 5/2013 | Stahlin | G01C 21/30 340/995.25 |
| 8,468,214 B1 * | 6/2013 | Bourlas | H04L 67/12 709/217 |
| 8,494,759 B2 * | 7/2013 | Hada | G08G 1/0112 701/117 |
| 8,520,695 B1 * | 8/2013 | Rubin | G08G 9/02 370/337 |
| 8,560,609 B2 * | 10/2013 | Nathanson | G07C 5/008 370/341 |
| 8,577,703 B2 * | 11/2013 | McClellan | G06Q 40/02 705/7.11 |
| 8,594,707 B2 * | 11/2013 | Morrison | G08G 1/096725 455/456.3 |
| 8,666,591 B2 * | 3/2014 | Stahlin | 701/32.4 |
| 8,751,150 B2 * | 6/2014 | Stahlin | G01C 21/32 340/511 |
| 8,762,518 B2 * | 6/2014 | Chen | H04L 45/20 709/209 |
| 8,781,733 B2 * | 7/2014 | Staehlin | G01C 21/28 701/450 |
| 8,796,881 B2 * | 8/2014 | Davis | B60L 11/1842 307/69 |
| 8,842,021 B2 * | 9/2014 | Behm | G08G 1/0965 340/426.16 |
| 9,117,098 B2 * | 8/2015 | Trombley | G06G 1/00 |
| 2001/0044315 A1 * | 11/2001 | Aoki | H04L 1/0007 455/524 |
| 2002/0198632 A1 * | 12/2002 | Breed | B60N 2/2863 701/1 |
| 2004/0049343 A1 * | 3/2004 | Yamadaji | G08G 1/161 701/301 |
| 2004/0167710 A1 * | 8/2004 | Fushiki | G08G 1/0104 701/532 |
| 2004/0230345 A1 * | 11/2004 | Tzamaloukas | G01C 21/26 701/1 |
| 2004/0230370 A1 * | 11/2004 | Tzamaloukas | G01C 21/3492 701/400 |
| 2005/0088318 A1 * | 4/2005 | Liu | G08G 1/161 340/902 |
| 2005/0137756 A1 * | 6/2005 | Takahashi | G08G 1/161 701/1 |
| 2005/0168350 A1 * | 8/2005 | Tauchi | G08G 1/161 340/903 |
| 2005/0222764 A1 * | 10/2005 | Uyeki | G01C 21/3415 701/414 |
| 2007/0002866 A1 * | 1/2007 | Belstner | H04W 40/00 370/395.4 |
| 2007/0112503 A1 * | 5/2007 | Johnson | G08G 1/0104 701/117 |
| 2007/0146162 A1 * | 6/2007 | Tengler | G08G 1/0962 340/905 |
| 2007/0213922 A1 * | 9/2007 | Van Buer | G08G 1/0104 701/117 |
| 2007/0271029 A1 * | 11/2007 | Tzamaloukas | G01C 21/28 701/532 |
| 2009/0168742 A1 * | 7/2009 | Sumcad | G01D 21/00 370/345 |
| 2009/0228172 A1 * | 9/2009 | Markyvech | G01S 5/0072 701/36 |
| 2009/0287412 A1 * | 11/2009 | Menzel | G01C 21/3688 701/117 |
| 2010/0074141 A1 * | 3/2010 | Nguyen | H04L 41/12 370/254 |
| 2010/0152951 A1 * | 6/2010 | Chin | B60W 40/09 701/31.4 |
| 2010/0164789 A1 * | 7/2010 | Basnayake | G01S 5/0072 342/357.23 |
| 2010/0195511 A1 * | 8/2010 | Hyland | G01S 5/0036 370/252 |
| 2010/0198513 A1 * | 8/2010 | Zeng | B60W 40/02 701/300 |
| 2010/0209881 A1 * | 8/2010 | Lin | G09B 19/167 434/65 |
| 2010/0234071 A1 * | 9/2010 | Shabtay | H04B 7/0408 455/562.1 |
| 2010/0324775 A1 * | 12/2010 | Kermani | B60K 31/0058 701/31.4 |

(56) References Cited

U.S. PATENT DOCUMENTS

| | | | | |
|---|---|---|---|---|
| 2011/0054716 A1* | 3/2011 | Stahlin | ............... | G01C 21/28 701/1 |
| 2011/0071756 A1 | 3/2011 | Stählin | | |
| 2011/0098877 A1* | 4/2011 | Stahlin | ............... | G08G 1/161 701/31.4 |
| 2011/0161032 A1 | 6/2011 | Stählin | | |
| 2011/0231546 A1* | 9/2011 | Nathanson | ............... | G07C 5/008 709/224 |
| 2013/0114446 A1* | 5/2013 | Liu | ............... | H04W 24/10 370/252 |
| 2013/0162445 A1* | 6/2013 | Bessler | ............... | G08C 17/02 340/870.3 |
| 2013/0245941 A1* | 9/2013 | Stahlin | ............... | G01C 21/28 701/532 |
| 2013/0342368 A1* | 12/2013 | Nathanson | ............... | G07C 5/008 340/903 |

FOREIGN PATENT DOCUMENTS

| | | |
|---|---|---|
| CN | 101383768 | 3/2009 |
| DE | 102005010888 A1 | 9/2006 |
| DE | 102008012654 A1 | 3/2009 |
| DE | 102008020446 A1 | 3/2009 |
| DE | 102008036131 A1 | 3/2009 |
| EP | 1256781 A1 | 11/2002 |

OTHER PUBLICATIONS

Chinese Office Action for Chinese Pat. App. No. 2010800245776, dated Dec. 4, 2013.

* cited by examiner

C2X COMMUNICATION WITH REDUCED DATA VOLUME

CROSS REFERENCE TO RELATED APPLICATIONS

This application is the U.S. National Phase Application of PCT International Application No. PCT/EP2010/056202, filed May 6, 2010, which claims priority to German Patent Application No. 10 2009 026653.4, filed Jun. 3, 2009, and German Patent Application No. 10 2010 002 093.1, filed Feb. 18, 2010, the contents of such applications being incorporated by reference herein.

FIELD OF THE INVENTION

The invention relates to the communication between a vehicle and an adjacent vehicle or an infrastructure. In particular, the invention relates to a communication device for a vehicle for vehicle-to-X communication, a vehicle having a communication device, the use of a communication device in an infrastructure device, a method for vehicle-to-X communication, a program element and a computer-readable medium.

BACKGROUND OF THE INVENTION

Vehicles are able to communicate with adjacent vehicles and/or infrastructure devices. This type of communication is called vehicle-to-X communication, or C2X communication for short. In this context, the symbol "X" stands for an adjacent vehicle or an infrastructure device.

Since the bandwidth for the data transmission may be limited for such C2X communication, it is sometimes not possible to transmit the necessary data quickly enough. For large data packets, there may even be missed transmissions.

SUMMARY OF THE INVENTION

It is an aim of the invention to improve C2X communication.

The invention specifies a communication device for a vehicle for vehicle-to-X communication, a vehicle having such a communication device, the use of such a communication device in an infrastructure device, a method for vehicle-to-X communication, a program element and a computer-readable medium according to the features of the independent claims. Developments of the invention can be found in the subclaims.

The exemplary embodiments described relate in equal measure to the communication device, the vehicle, the use, the method, the program element and the computer-readable medium. In other words, features which are described below in respect of the communication device, for example, can also be implemented as method steps in the method, and vice versa.

According to one exemplary embodiment of the invention, a communication device for a vehicle for vehicle-to-X communication is specified which has a communication unit and a control unit. The communication unit is designed to receive first data from an adjacent vehicle and/or an infrastructure device, wherein the first data contain a first component information item or correspond to a first component information item. The control unit is designed to obtain a full information item from the received first data and particularly from the received first component information item using a supplementary information item which is present in the vehicle, wherein the first component information item has a smaller data volume than the first full information item.

In other words, the data volume to be transmitted is reduced, since particular information which is necessary for obtaining the full information item from the transmitted data is not transmitted at the same time, but rather is already present in the vehicle or is automatically obtained by the vehicle sensor system and/or ambient sensor system.

According to a further aspect of the invention, a vehicle having a communication device as described above and below is specified.

According to a further aspect of the invention, the use of a communication device as described above and below in an infrastructure device is specified.

A further aspect of the invention relates to an infrastructure device having a communication device as described above and below.

A further aspect of the invention relates to the use of a communication device as described above and below in a vehicle.

According to a further aspect of the invention, a method for vehicle-to-X communication is specified in which first data are sent by an adjacent vehicle and are received by a receiver in a communication device which is arranged in an individual vehicle, for example. The receiver may naturally also be arranged in an infrastructure device. The first data contain a first component information item. In a subsequent method step, a full information item is obtained from the received first component information item using a supplementary information item which is present in the receiving vehicle or the receiving infrastructure device. In this case, the first component information item has a smaller data volume than the first full information item.

According to a further aspect of the invention, a program element is specified which, when it is executed on a processor in a communication device, prompts the communication device to perform the steps described above and below.

According to a further aspect of the invention, a computer-readable medium is specified which contains a program element which, when it is executed on a processor in a communication device, prompts the communication device to perform the steps described above and below.

A core aspect of the invention can be regarded as being that the data volume to be transmitted is reduced. In this connection, it is also possible to refer to shortening the data packets which are to be transmitted. This makes use of the fact that the range of the data transmission may be limited in practice to significantly less than 5 km and said data transmission can take place almost in real time. This can make use of particularly the C2X radio transmission properties for the data compression of what is known as the "payload", that is to say the data volume to be transmitted. This applies particularly to the transmission in the sub-GHz frequency range, such as in the 868-MHz Band.

The communication module may be designed for C2X radio transmission according to IEEE 802.11p. In particular, it may be designed for transmission with a bandwidth of 3 Mbit/s or 6 Mbit/s.

If the transmission takes place in the 868-MHz band, for example, the communication device may be designed for transmission at a rate of 19 200 bauds, for example.

It is advantageous if as many supplementary information items as possible, which are already present in the vehicle or are obtained in the vehicle, can be used in order to obtain the full information item from the transmitted component information item. This allows the data volume of the component information item to be minimized.

According to a further exemplary embodiment of the invention, at least a portion of the supplementary information item which is present in the vehicle is the position of the vehicle.

According to a further exemplary embodiment of the invention, at least a portion of the supplementary information item which is present in the vehicle is the current time. Naturally, the vehicle may also have further supplementary information items present which are used to obtain the full information item.

According to a further exemplary embodiment of the invention, the communication unit is designed to send second data to the adjacent vehicle, wherein the second data contain a second component information item, and wherein the control unit is designed to produce the second component information item from a second full information item. The second component information item also has a smaller data volume than the second full information item.

In other words, provision is made for the full information items to be obtained from the different data packets using different component information items. In order to obtain a first full information item, it is possible to use the vehicle position, for example, and in order to obtain a second full information item, it is possible to use the current time, for example.

According to a further exemplary embodiment of the invention, the control unit is designed to compress the second data prior to sending. The control unit may also be designed to compress the first data prior to sending.

According to a further exemplary embodiment of the invention, the degree of reduction in the data volume of the first component information item in relation to the data volume of the first full information item is dependent on a transmission property of the communication between the vehicle and the adjacent vehicle (or between the vehicle and an infrastructure device or between an infrastructure device and a vehicle, etc.).

According to a further exemplary embodiment of the invention, the degree of reduction in the data volume of the first component information item in relation to the data volume of the first full information item is dependent on the geographical latitude at which the vehicle is located.

According to a further exemplary embodiment of the invention, the degree of reduction in the data volume of the first component information item in relation to the data volume of the first full information item is dependent on a maximum transmission range of the communication between the vehicle and the adjacent vehicle (or the infrastructure device).

According to a further exemplary embodiment of the invention, the control unit is designed to perform a plausibility check on the obtained full information item. In this way, erroneously transmitted data, abusively transmitted data or an erroneously obtained full information item can be identified and eliminated or revised.

According to a further exemplary embodiment of the invention, the communication device is designed for data transmission according to IEEE 802.11p.

Alternatively, it is possible to use other transmission protocols, for example GSM, UMTS, LTE, WiMAX, WLAN, Bluetooth, ZigBee or UWB.

For the rest, it should be borne in mind that the vehicle may be, by way of example, a motor vehicle, such as a car, bus or heavy goods vehicle, or else a rail vehicle, a ship, an aircraft, such as a helicopter or an airplane, or, by way of example, a bicycle.

In addition, it should be pointed out that, within the context of the present invention, GPS is representative of all global navigation satellite systems (GNSS), such as GPS, Galileo, GLONASS (Russia), Compass (China), IRNSS (India).

In addition, it should be pointed out that the position finding for the vehicle can be effected using a GPS appliance or else by means of cell positioning. This is appropriate particularly when using GSM, UMTS, WiMax or WLAN networks.

The program element may be part of a piece of software which is stored on a processor in the communication device. In this case, the processor may likewise be the subject matter of the invention. In addition, the program element can use the invention right from the outset or else can be prompted to use the invention by virtue of an update.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
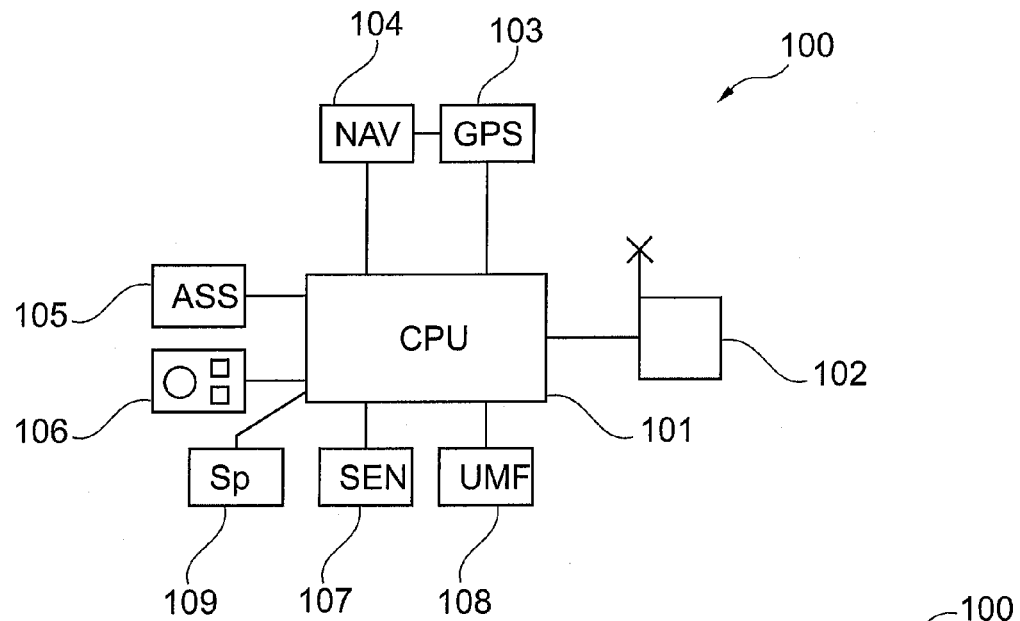
FIG. 1 shows a communication device based on an exemplary embodiment of the invention.

The illustrations in the figures are schematic and not to scale.

In the description of the figures which follows, the same reference numerals are used for the same or similar elements.

FIG. 1 shows a communication device 100 which has a control unit 101 and a communication unit 102 connected thereto. At this juncture, it should be noted that the data transmission between individual components of the communication device 100 may also be provided wirelessly.

As can be seen in FIG. 1, the communication device has a navigation unit 104. A driver assistance unit 105 is also provided. The reference symbol 106 denotes a man/machine interface for the input and output of information.

In addition, a vehicle sensor system 107 and an ambient sensor system 108 are provided which can likewise be used in order to obtain the supplementary information items.

For the rest, a memory device 109 may naturally also be provided which stores the supplementary information items, for example.

By way of example, the communication device 100 is designed for data transmission in the free 868-MHz band, which, in built-up surroundings, can result in advantages in comparison with data transmission according to IEEE 802.11p. However, the 868-MHz band is limited to a relatively great degree, e.g. to 19 200 bauds in comparison with at least 3 megabauds in the case of IEEE 802.11p.

Even with IEEE 802.11p, however, it has been found that short data packets attain a greater effective range than long data packets.

So as thus to increase the range for the data transmission and/or to lower the probability of a data packet being transmitted erroneously, the data packets are shortened or reduced. In this context, it is possible to make use of the fact that the range of the data transmission is limited to significantly less than 5 km in practice and takes place almost in real time.

The text below presents two possible types for the data reduction.

For the position transmission, the (GPS) position of the transmitter can be transmitted as a complete data record comprising an absolute geographical longitude and geographical latitude with degree statements, minute statements and second statements. This usually requires 2×4=8 bytes.

However, since it is normally known that the other radio partner can be only a maximum of 2 km away (because this is the maximum communication range under the given circumstances, since otherwise its data packets which are sent cannot be received), for example, and since additionally the position of the receiver (that is to say of the vehicle or of the infrastructure device) is known precisely (for example as a result of position finding by the GPS unit 103), it is possible to transmit only a low-value portion of the position. It can then be left to the receiver (the reception-end communication device) to reconstruct the absolute position of the transmitter using its own position.

By way of example, a simple method involves only the angle minutes of the GPS position and not the degrees being transmitted. This allows the position of the transmitter to be transmitted without loss of information in 2×3=6 bytes.

It is not necessary for both communication partners 100 to agree their position beforehand using the degree statements. If one partner establishes that the completed partner position (full information item) results in a distance between the transmitter and the receiver which is greater than 2 km (or greater than the maximum transmission range) then it simply takes the next highest (or next lowest) degree basis until it obtains a plausible distance. In other words, the full information item obtained is verified and corrected if necessary.

At any rate, this method works up to a geographical latitude of approximately 85 degrees. From approximately 85 degrees of geographical latitude onward, the distance between two degrees of longitude falls to approximately 10 km, which is why this method is then possibly no longer used for transmitting the geographical longitude, but rather is used only for transmitting the geographical latitude.

In order to be able to determine the signal delays between the radio partners, it is possible for an absolute time, in the form of a timestamp, to be transmitted in the radio packets. From the signal delays, it is possible to extrapolate the current position of the partner vehicle, for example.

By way of example, the milliseconds since midnight are transmitted, which results in 86 400 000 values, that is to say 28 bits or 4 bytes.

In accordance with the invention, it is possible to make use of the fact that the transmission time is usually shorter than one second, and, by way of example three seconds are never exceeded. Thus, the communication device can transmit only the fractions of a time window of 10 seconds, for example. This lowers the space requirement to 10 000 values, that is to say 15 bits or 2 bytes.

It is also a simple matter to reconstruct the timestamp using the individual absolute time.

In order to measure the absolute time, it is possible to use the GPS module 103, for example. If hopping takes place (that is to say transmission via intermediate stations), each intermediate transmitter can recode the position or the timestamp with its own position or with its own timestamp. In this case too, it is possible to use relative values for the transmission.

In addition, the required bandwidth for the data when using a radio key system (RKE, Remote Keyless Entry) can be reduced by dispensing with resolution. For a combination of RKE with IEEE 802.11p, it is possible for RKE to have a greater range than radio transmission using IEEE 802.11p. Furthermore, destinations which are further away are less important in the first place. It is therefore possible to use the RKE unit, for example, to transmit the position at a (low) resolution of 1 m and the time at a resolution of 10 milliseconds.

Only if the vehicles then approach one another does a higher resolution become more important, on the one hand, while, on the other hand, there is then also a high probability of the radio transmission according to IEEE 802.11p undertaking the data interchange.

It is also possible for the "prior reduction" of the data to be transmitted to be followed by further reduction using known compression methods. By way of example, this can involve the Zip compression format or precise-bit instead of bit-by-bit coding, for example.

The presented method can naturally also be used for communication using IEEE 802.11p.

A crucial aspect of the invention can be regarded as being that the data packet size for the radio transmission is reduced by using firstly transmission properties of the radio medium used and secondly a system-related common information basis. On account of the shorter data packet length, the effective range for the radio transmission can be increased. It is also possible to transmit more data packets per unit time.

Figure 2:
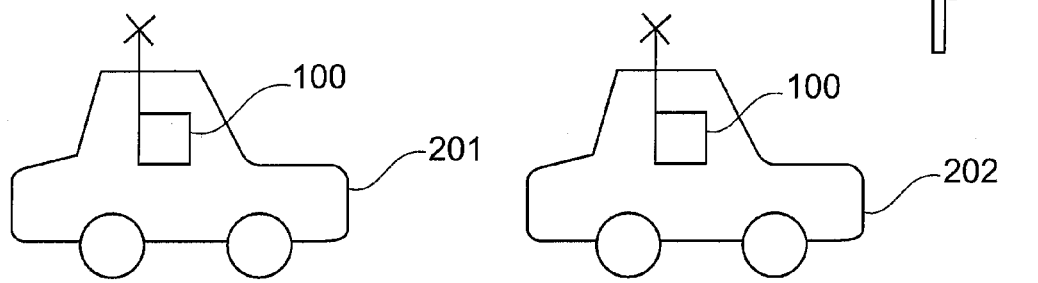
FIG. 2 shows a communication system based on an exemplary embodiment of the invention.

FIG. 2 shows a communication system based on an exemplary embodiment of the invention. The communication system has a plurality of adjacent vehicles 201, 202 and an infrastructure device, in this case in the form of a set of traffic lights 203. Each of the two vehicles and the infrastructure device have a dedicated communication device 100. The different communication devices 100 can communicate with one another and are designed to obtain the full information items from the transmitted data using supplementary information items which are present in the relevant communication device.

Figure 3:
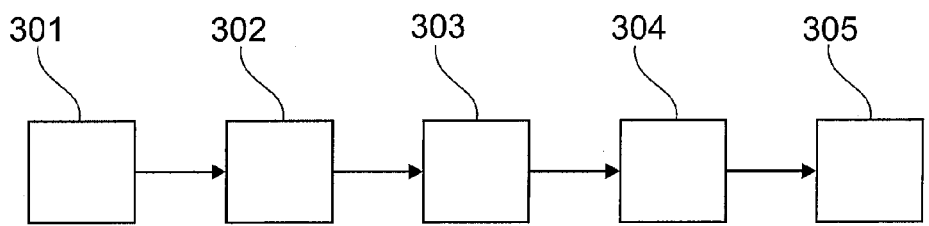
FIG. 3 shows a flowchart for a method based on an exemplary embodiment of the invention.

FIG. 3 shows a flowchart for a method based on an exemplary embodiment of the invention. In step 301, first data are sent by an adjacent vehicle or an infrastructure device and, in step 302, are received in a dedicated receiver of a communication device. The dedicated receiver may be installed in a vehicle, a mobile communication appliance (such as a mobile telephone) or an infrastructure device. In step 303, supplementary information items are used by the dedicated receiver, which information items are stored in the receiver, for example, or are obtained for the communication device by a dedicated sensor system by performing appropriate measurements. In step 304, a full information item is then obtained or produced from firstly the transmitted component information items and secondly the available supplementary information item. This full information item can then be presented to the user, for example visually and/or audibly, in step 305. It is also possible for the full information item to be sent to the driver assistance system or the navigation unit.

Figure 4:
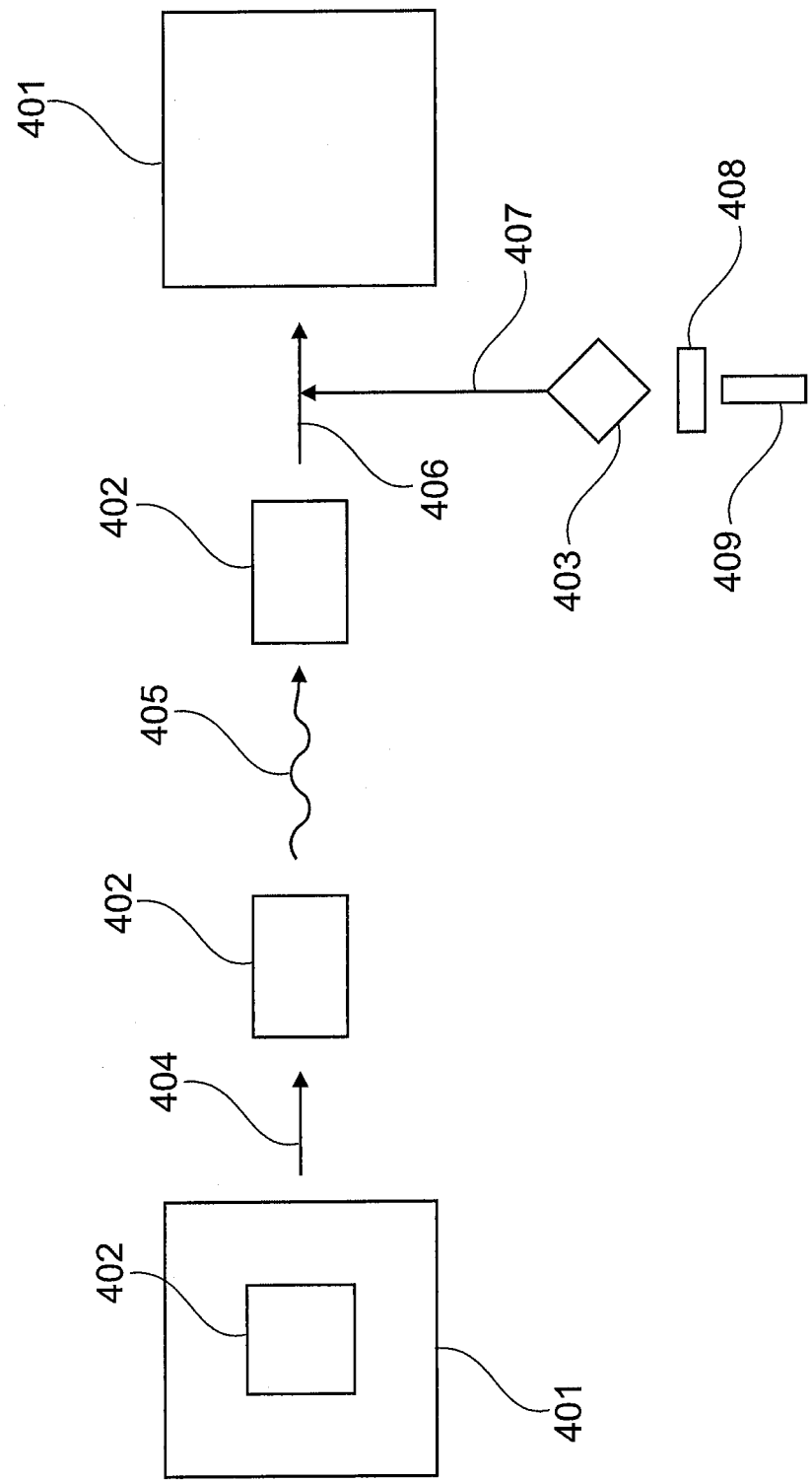
FIG. 4 shows the schematic illustration of a method based on an exemplary embodiment of the invention.

FIG. 4 shows a method based on an exemplary embodiment of the invention in graphical form. Reference symbol 401 shows the full information item which is intended to be provided for the receiver by the transmitter. First of all, a portion 402 of this full information item 401 is removed from the full information item (see arrow 404). This component information item 402 is then transmitted (see arrow 405).

The component information item 402 is received by the receiving communication device. In addition, the communication device identifies supplementary information items 403, 408, 409 which come from a different source (for example from the ambient sensor system, the vehicle sensor system or the position finding unit in the individual vehicle).

These supplementary information items are used to recover the full information item 401 from the transmitted component information item.

In addition, it should be pointed out that "comprising" and "having" do not exclude other elements or steps, and "a" or "an" does not exclude a large number. Furthermore, it should be pointed out that features or steps that have been described with reference to one of the above exemplary embodiments can also be used in combination with other features or steps from other exemplary embodiments described above. Reference symbols in the claims should not be regarded as restrictions.

The invention claimed is:

1. A communication device for a vehicle for vehicle-to-X communication, said communication device comprising:
   a communication unit for receiving first data transmitted from an adjacent vehicle, the first data containing a first component information item comprised of N data bytes indicating a relative position of the adjacent vehicle; and
   a control unit for reconstructing a full information item comprised of M data bytes indicating an absolute position of the adjacent vehicle based on the relative position of the adjacent vehicle indicated in the N data bytes and an absolute position of the vehicle, wherein M>N, and N is a number set based on at least one of: transmission property of the communication between the vehicle and the adjacent vehicle, geographical latitude at which the vehicle is located, and maximum transmission range of the communication between the vehicle and the adjacent vehicle.

2. The communication device as claimed in claim 1,
   wherein the supplementary information item which is present in the vehicle is at least to some extent the position of the vehicle.

3. The communication device as claimed in claim 1,
   wherein the supplementary information item which is present in the vehicle is at least to some extent the current time.

4. The communication device as claimed in claim 1,
   wherein the communication unit is designed to send second data to the adjacent vehicle, the second data containing a second component information item indicating a relative position of the vehicle;
   wherein the control unit is designed to produce the second component information item from a second full information item indicating an absolute position of the vehicle;
   wherein the second component information item indicating the relative position of the vehicle has a smaller data volume than the second full information item indicating the absolute position of the vehicle.

5. The communication device as claimed in claim 4,
   wherein the control unit is designed to compress the second data prior to sending.

6. The communication device as claimed in claim 1,
   wherein the degree of reduction in the data volume of the first component information item in relation to the data volume of the first full information item is dependent on a transmission property of the communication between the vehicle and the adjacent vehicle.

7. The communication device as claimed in claim 1,
   wherein the degree of reduction in the data volume of the first component information item in relation to the data volume of the first full information item is dependent on the geographical latitude at which the vehicle is located.

8. The communication device as claimed in claim 1,
   wherein the degree of reduction in the data volume of the first component information item in relation to the data volume of the first full information item is dependent on a maximum transmission range of the communication between the vehicle and the adjacent vehicle.

9. The communication device as claimed in claim 1,
   wherein the control unit is designed to perform a plausibility check on the obtained full information item.

10. The communication device as claimed in claim 1, wherein the device is designed for data transmission according to IEEE 802.11p.

11. A vehicle having a communication device as claimed in claim 1.

12. The use of a communication device as claimed in claim 1 in an infrastructure device.

13. A method for vehicle-to-X communication, said method comprising:
    receiving, by a vehicle communication unit of a vehicle, first data transmitted from an adjacent vehicle, the first data containing a first component information item comprised of N data bytes indicating a relative position of the adjacent vehicle; and
    reconstructing, by a vehicle control unit of the vehicle, a full information item comprised of M data bytes indicating an absolute position of the adjacent vehicle based on the relative position of the adjacent vehicle indicated in the N data bytes and an absolute position of the vehicle, wherein M>N, and N is a number set based on at least one of: transmission property of the communication between the vehicle and the adjacent vehicle, geographical latitude at which the vehicle is located, and maximum transmission range of the communication between the vehicle and the adjacent vehicle.

14. A non-transitory computer-readable medium which contains a program element which, when it is executed on a processor in a communication device, prompts the communication device to perform the following steps:
    receiving, by a vehicle communication unit of a vehicle, first data transmitted from an adjacent vehicle, the first data containing a first component information item comprised of N data bytes indicating a relative position of the adjacent vehicle; and
    reconstructing, by a vehicle control unit of the vehicle, a full information item comprised of M data bytes indicating an absolute position of the adjacent vehicle based on the relative position of the adjacent vehicle indicated in the N data bytes and an absolute position of the vehicle,
    reconstructing, by a vehicle control unit of the vehicle a full information item comprised of M data bytes indicating an absolute position of the adjacent vehicle based on the relative position of the adjacent vehicle indicated in the N data bytes and an absolute position of the vehicle, wherein M>N, and N is a number set based on at least one of: transmission property of the communication between the vehicle and the adjacent vehicle, geographical latitude at which the vehicle is located, and maximum transmission range of the communication between the vehicle and the adjacent vehicle.

* * * * *